United States Patent [19]
Miichi et al.

[11] Patent Number: 5,438,515
[45] Date of Patent: Aug. 1, 1995

[54] ALIGNMENT CONTROL UNIT AND CONTROL METHOD FOR AN AUTOMOTIVE SUSPENSION

[75] Inventors: Yoshiki Miichi; Tadao Tanaka; Mitsuhiko Harara, all of Okazaki, Japan

[73] Assignee: Mitsubishi Jidosha Kogyo Kabushiki Kaisha, Tokyo, Japan

[21] Appl. No.: 134,894

[22] Filed: Oct. 13, 1993

[30] Foreign Application Priority Data

Oct. 14, 1992 [JP] Japan ................. 4-276257
Oct. 14, 1992 [JP] Japan ................. 4-276258
Dec. 3, 1992 [JP] Japan ................. 4-324210

[51] Int. Cl.$^6$ .................. B60G 17/00; B62D 17/00
[52] U.S. Cl. .................. 364/424.05; 280/661; 280/91; 33/203.18
[58] Field of Search .......... 364/424.05, 426.04, 364/559, 571.02, 571.04, 571.07; 33/203.18, 645; 280/840, 707, 94, 91, 661; 180/140, 234, 79.1

[56] References Cited

U.S. PATENT DOCUMENTS

| | | | |
|---|---|---|---|
| 4,191,274 | 3/1980 | Goldberg et al. | 180/282 |
| 4,353,568 | 10/1982 | Boyce | 280/94 |
| 4,371,191 | 2/1983 | Goldberg et al. | 280/707 |
| 4,666,013 | 5/1987 | Shibahata et al. | 364/424.05 |
| 4,705,131 | 11/1987 | Shibahata et al. | 180/140 |
| 4,786,066 | 11/1988 | Kondo et al. | 280/91 |
| 4,796,720 | 1/1989 | Bauer | 180/234 |
| 4,828,283 | 5/1989 | Ishii et al. | 364/424.05 |
| 5,018,594 | 5/1991 | Takahaghi et al. | 364/424.05 |
| 5,195,601 | 3/1993 | Voigt et al. | 180/79.1 |

FOREIGN PATENT DOCUMENTS

| | | |
|---|---|---|
| 0001009 | 3/1979 | European Pat. Off. |
| 59-67111 | 4/1984 | Japan |
| 60-151181 | 8/1985 | Japan |
| 6-193781 | 10/1985 | Japan |
| 3-157215 | 7/1991 | Japan |
| 3-157217 | 7/1991 | Japan |

*Primary Examiner*—Kevin J. Teska
*Assistant Examiner*—Tan Nguyen

[57] ABSTRACT

An alignment control unit and method for an automotive suspension are provided in which a basic control amount is determined in accordance with a detected steering angle, and the alignment is controlled in accordance with a product value obtained by multiplying the determined basic control amount by a control gain. The control gain may be set such that an actual control amount of an actuator is changed to be increased when the detected steering angle exceeds a specified value or may be set in accordance with a detected lateral acceleration such that it increases as the lateral acceleration increases. The toe angle or camber angle of a wheel may be controlled in accordance with the basic control amount.

39 Claims, 15 Drawing Sheets

F I G. 1
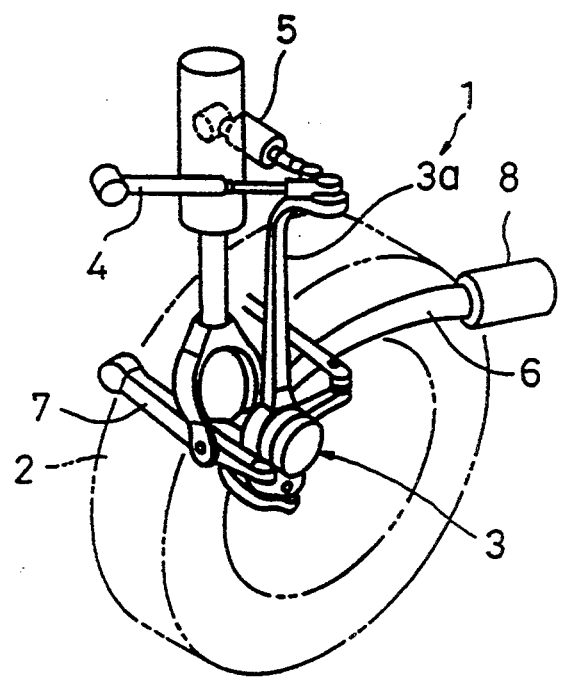

ALIGNMENT CONTROL UNIT AND CONTROL METHOD FOR AN AUTOMOTIVE SUSPENSION

BACKGROUND OF THE INVENTION

1. Field of the Invention

The present invention relates to an alignment control unit and a control method for an automotive suspension.

2. Description of the Related Arts

When a vehicle turns while traveling, its body rolls, causing the camber angle of outer turning wheel against the ground to increase in the positive direction, and the camber angle of the inner turning wheel to increase in the negative direction. When the vehicle turns, therefore, it is desirable to operate an actuator so as to reduce the camber angles of the outer and inner turning wheels respectively increased in the positive and negative directions, to thereby ensure good contact of the wheels against the ground, thus improving the turning stability and turning limit of the vehicle. It is also desirable that, when the vehicle travels straight, a controller operates the actuator to control a caster angle and the like such that the straight-line travel stability may be improved.

Desirably, maneuverability or steering wheel operability at slow-speed traveling should be improved, so that the steering amount required for a driver to drive his/her car into a garage or to turn the steering wheel with the car kept stopped may be reduced.

In general, it is possible to improve the steering wheel operability at low-speed traveling by setting a steering-to-gear ratio of a vehicle to a small value so as to increase the change in the orientation of wheels with respect to the amount of steering operation. In this case, however, a slight steering operation will cause a significant change in the orientation of the wheels, leading to deteriorated stability when traveling straight ahead at high speed. Thus, there has been a demand for improving both the straight-line stability when traveling at high speed and the steering wheel operability when traveling at low speed.

The centrifugal force applied to the tires (lateral acceleration applied to the crosswise direction of the vehicle), when a vehicle turns while traveling, increases as the car speed increases or as the turning radius decreases. On the other hand, if the slip angle of a tire stays constant regardless of the turning car speed, then a constant cornering force is generated. For this reason, if the steering amount is the same, the same turning track cannot be maintained if the turning speed increases. In other words, high-speed turning cannot be achieved by the same steering amount as that given at the time of low-speed turning. Thus, there has been a demand for an alignment control unit which will improve high-speed turning performance.

Conventionally, an alignment control unit for an automotive suspension unit of a type having an actuator for changing the arm length of a specific suspension arm, or changing its installing position on a car body has been known through Japanese Patent Provisional Publication Nos. 59-67111, 60-151181 and 60-193781, for instance. The alignment control unit disclosed in these publications is capable of merely changing the alignment of the suspension unit, that is, the caster angle of the suspension unit and the toe angle, camber angle, and the like of wheels, by driving the actuator.

It is defined that the caster angle is the tilting angle of the central line of the king pin projected to the vertical central surface of a car with respect to a vertical line, the toe angle is the angle formed by the longitudinal central surface of the car and the horizontal diameter of the wheel, and the camber angle is the angle formed by the central surface of the wheel and the vertical line.

Alignment control units disclosed in Japanese Patent Provisional Publication Nos. 3-157215 and 3-157217 are designed so that the control amount of the camber angle with respect to the steering angle or lateral acceleration is nonlinearly increased as the steering angle or lateral acceleration increases when the car turns while traveling. However, the alignment control unit of a type disclosed in Japanese Patent Provisional Publication Nos. 3-157215 and 3-157217, which merely changes the camber angle nonlinearly with respect to the steering angle (lateral acceleration), does not fully meet the demand for improving both the straight-line stability when traveling at high speed and the steering wheel operability when traveling at low speed.

Further, an alignment control unit disclosed in Japanese Patent Provisional Publication No. 3-157217 is designed to improve the turning performance by multiplying a control amount of the camber angle by a correction factor, which has been preset according to car speed. This prior art, which is intended to correct the control gain of the camber angle in accordance with car speed, does not fully satisfy the demand for improving both the straight-line stability when traveling at high speed and the steering wheel operability when making a turn while traveling at low speed.

OBJECTS AND SUMMARY OF THE INVENTION

A major object of the present invention is to provide an alignment control unit and a control method for an automotive suspension which are capable of improving both straight-line stability when traveling at high speed and the steering wheel operability when making a turn while traveling at low speed.

According to the present invention, an alignment control unit for an automotive suspension is provided, which has a driving mechanism including an actuator for changing alignment of a suspension of at least either front wheels or rear wheels of a vehicle, and which has a steering angle sensor means for detecting a steering angle of the vehicle, and a controller for setting an alignment control amount in accordance with the steering angle detected by the steering angle sensor and for controlling operation of the actuator in accordance with the set alignment control amount.

The controller of the alignment control unit of the present invention includes a control gain changing means for changing a working amount of the actuator in accordance with the set alignment control amount. The control gain changing means is operable to change a control gain such that the working amount of the actuator increases as the steering angle detected by the steering angle sensor increases.

According to another aspect of the present invention, an alignment control method for an automotive suspension is provided, which comprises the steps of detecting a steering angle, determining an alignment control amount in accordance with the detected steering angle, determining a control gain in accordance with the detected steering angle such that the control gain is set to a value which increases as the steering angle increases, and controlling alignment in accordance with a product value obtained by multiplying the determined alignment control amount by the control gain.

Preferably, the control gain is changed such that a working amount of the actuator is increased when the detected steering angle exceeds a specified value.

According to a further aspect of the present invention, an alignment control unit is provided. A controller of the control unit includes a control gain changing means for changing a working amount of the actuator in accordance with a set alignment control amount, and a lateral acceleration sensor means for detecting a lateral acceleration acting on a vehicle in a crosswise direction of the vehicle. The control gain changing means is operable to change the control gain such that the working amount of the actuator increases as the lateral acceleration detected by the lateral acceleration sensor increases.

According to an yet another aspect of the present invention, an alignment control method for an automotive suspension is provided, which comprises the steps of detecting a steering angle, determining a lateral acceleration acting on a vehicle in a crosswise direction of the vehicle, determining an alignment control amount in accordance with the detected steering angle, determining a control gain in accordance with the detected lateral acceleration such that the control gain is set to a value which increases as the lateral acceleration increases, and controlling alignment in accordance with a product value obtained by multiplying the determined alignment control amount by the control gain.

The toe angles or camber angles of associated wheels may be controlled in accordance with the alignment control amount.

According to the present invention, an equivalent steering-to-gear ratio can be decreased by increasing the changing amount of the orientation of wheels with respect to the steering amount when making a turn at a large steering angle or with a high level of lateral acceleration. On the other hand, a driver does not steer at a large angle when driving at high speed. Therefore, the equivalent steering-to-gear ratio is not set to a small value when driving at high speed, thus presenting an excellent effect in which both the straight-line stability when traveling at high speed and the steering wheel operability when traveling at low speed can be improved.

These and other objects, characteristics, and advantages of this invention will be made further apparent from the following detailed explanation.

BRIEF DESCRIPTION OF THE DRAWINGS

FIG. 1 is a perspective view of an embodiment of the suspension to which the alignment control method according to the present invention is applied;

DETAILED DESCRIPTION OF THE PREFERRED EMBODIMENTS

Figure 2:
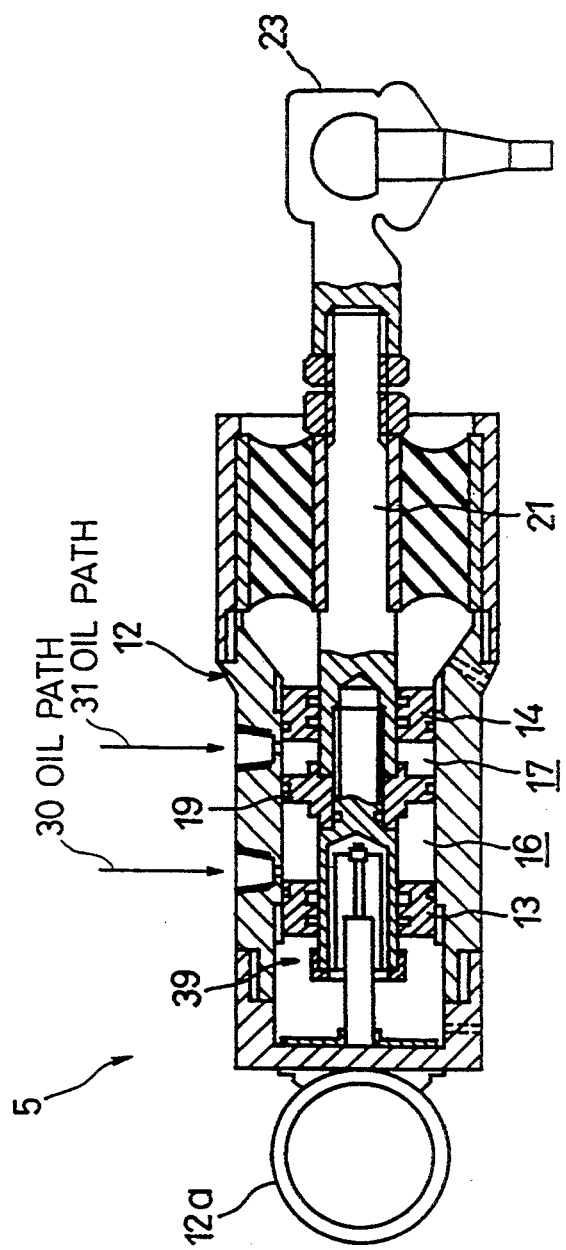
FIG. 2 is a detailed cross-sectional view of an actuator mechanism 5 with a variable-length arm of the suspension shown in FIG. 1.

FIG. 1 shows the configuration of a suspension to which the alignment control unit according to the present invention is applied. The suspension 1 is, for example, a double-wishbone type suspension which links the right and left wheels at both front and rear to a car body. FIG. 1 shows a suspension 1 which, for instance, links a left front wheel 2 to the car body (not shown). All suspensions 1 have the same configuration, therefore, the explanation and drawings for the suspensions 1 which link the right front wheel and both rear wheels to the car body will be omitted.

The suspension 1 consists primarily of a knuckle 3 which rotatably supports a wheel 2, an upper arm 4 and an actuator mechanism 5 with a variable-length arm which link an extended part 3a of the knuckle 3 to the car body which is not shown, a pair of lower arms 6 and 7 which link the bottom end of the knuckle 3 to the car body, and an actuator mechanism 8 with a variable-length arm which is installed between the lower arm 6 and the car body. The actuator mechanisms 5 and 8 with variable-length arms are operated by a controller 10 and a driving circuit 40.

The trail of the suspension 1 is set at a specified plus distance. Accordingly, an adequate restoring torque for ensuring improved straight-line travel performance of the vehicle is generated around a virtual king pin axis of the suspension.

The actuator mechanism 5 with a variable-length arm is an arm-shaped hydraulic cylinder, as shown in FIG. 2. The actuator mechanism 5 is mainly comprised of an outer cylinder 12, a pair of partition walls 13 and 14 received in the outer cylinder 12, a piston 19 which divides the space between the partition walls 13 and 14 into a hydraulic chamber 16 and a hydraulic chamber 17, and a working rod 21 which reciprocates as one piece with the piston 19. At the proximal end of the outer cylinder 12, a mounting part 12a is formed. The mounting part 12a is installed on the car body via an elastic bush. The tip of the working rod 21 is connected to the extended part 3a of the knuckle 3 via a ball joint 23. Further, a displacement sensor 39 is provided between the outer cylinder 12 and the working rod 21. The displacement sensor 39 is a sensor that detects the position of the reciprocating piston 19.

The actuator mechanism 5 constitutes a part of a first hydraulic circuit 23 (FIG. 3 and FIG. 4), oil paths 30 and 31 being connected to the hydraulic chambers 16 and 17, respectively. Accordingly, when the hydraulic oil pressure is applied to the hydraulic chamber 16 via the oil path 30, the piston 19 moves forward while draining the oil from the hydraulic chamber 17 into the oil path 31, thus causing the working rod 21 to extend. On the other hand, when the hydraulic oil pressure is supplied to the hydraulic chamber 17 via the oil path 31, the piston 19 moves back while draining the oil from the hydraulic chamber 16 into the oil path 30, thus causing the working rod 21 to contract.

The actuator mechanism 8 with variable-length arm is also a hydraulic cylinder which has the same configuration as that of the actuator mechanism 5 of FIG. 2. Therefore, the detailed explanation and illustration for the actuator mechanism 8 will be omitted. The actuator mechanism 8 constitutes a part of a second hydraulic circuit 24, and oil paths are connected to the hydraulic chambers of the actuator mechanism 8.

Figure 3:
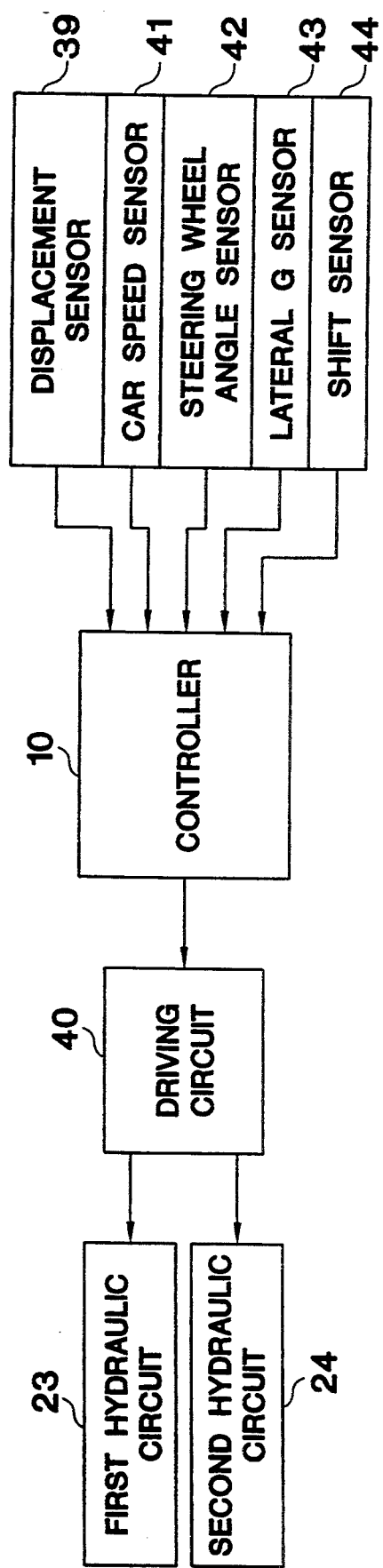
FIG. 3 is a block diagram which shows a control system of the suspension of FIG. 1.

As shown in FIG. 3, the operating system of each of the actuator mechanisms 5 and 8 mainly consists of the first and second hydraulic circuits 23 and 24, a driving circuit 40, and a controller 10.

Figure 4:
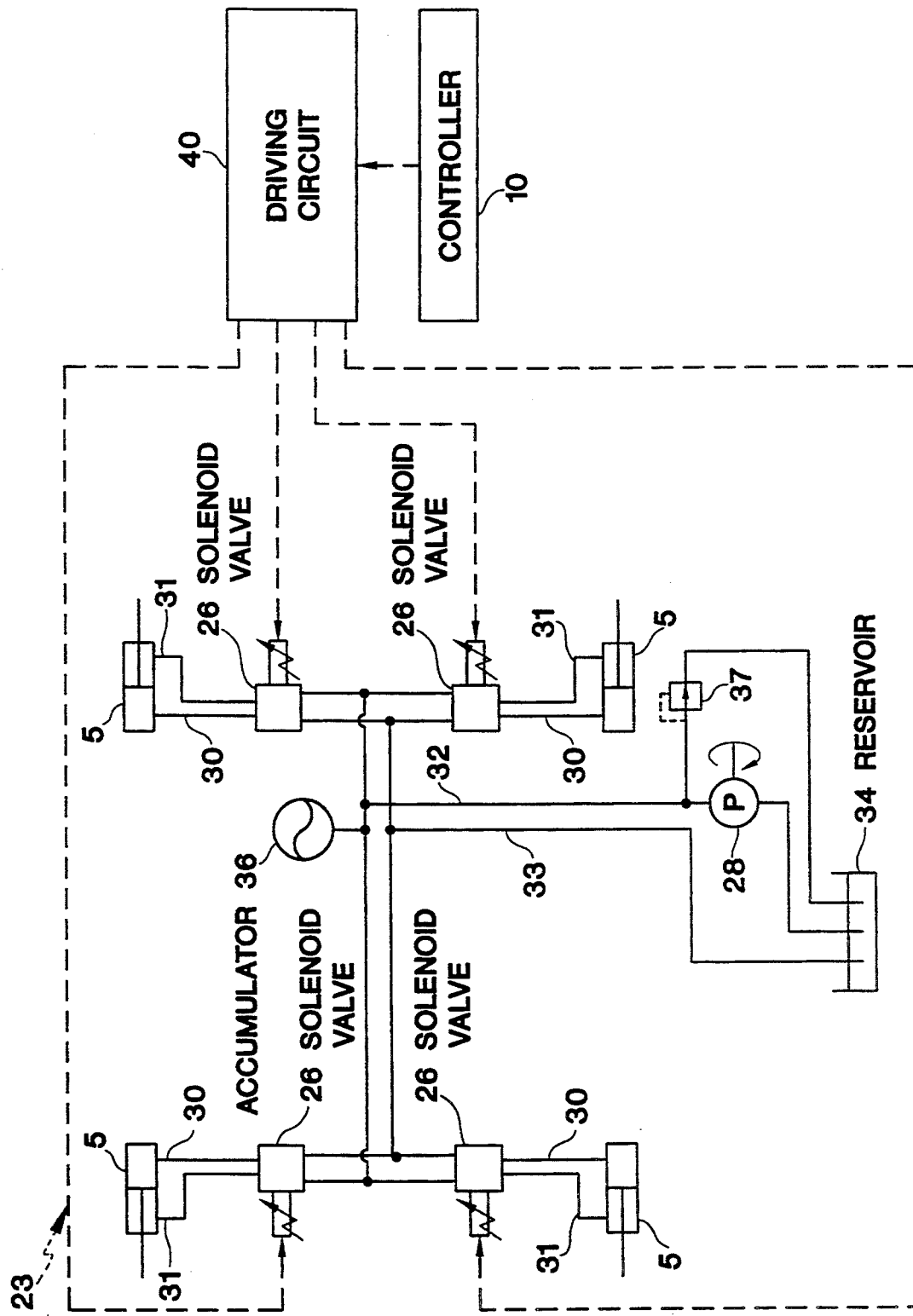
FIG. 4 is a circuit diagram which shows the details of the first hydraulic circuit 23 of FIG. 3.

The first hydraulic circuit 23 mainly consists of the aforesaid actuator mechanisms 5, solenoid control valves 26, and a hydraulic pump 28, as shown in FIG. 4. Each actuator mechanism 5 is connected to each solenoid valve 26 via the oil paths 30 and 31. Each solenoid control valve 26 is connected to the hydraulic pump 28 via a supply path 32 and also connected to an oil reservoir 34 via a drain path 33.

An accumulator 36 is connected to the middle of the supply path 32. The supply path 32 is connected to the oil reservoir 34 via a relief valve 37. When the pressure in the accumulator 36 is lower than a lower limit value, the hydraulic pump 28 is driven to suck in the oil from the oil reservoir 34 and discharge it into the supply path 32. Thus, the pressure in the supply path 32 is always maintained within a specified pressure range. The hydraulic pump 28 can be driven by an automotive engine, electric motor or the like which is not shown.

Each solenoid control valve 26 has first through third positions. When the solenoid control valve 26 is switched to the first position, all the oil paths 30 and 31, the supply path 32, and the drain path 33 are closed, thereby hydraulically locking the working rod 21 of the actuator mechanism 5. When the solenoid valve is shifted to the second position, the supply path 32 is connected to the oil path 30 and the oil path 31 is connected to the drain path 33, thus causing the working rod 21 to extend. Further, when the solenoid valve is shifted to the third position, the supply path 32 is connected to the oil path 31 and the oil path 30 is connected to the drain path 33, thus causing the working rod 21 to contract.

Each solenoid control valve 26 is electrically connected to the driving circuit 40. Each solenoid control valve 26 shifts its position in response to a control signal received from the driving circuit 40.

The second hydraulic circuit 24 mainly consists of the aforesaid actuator mechanisms 8, solenoid control valves, and a hydraulic pump. The second hydraulic circuit 24 has the same configuration as that of the first hydraulic circuit 23. Therefore, the explanation and illustration for the second hydraulic circuit 24 are omitted. Preferably, the hydraulic pump and oil reservoir configuring the hydraulic circuits 23 and 24 should be the common ones.

The driving circuit 40 is electrically connected to the controller 10 to receive a caster angle control signal value Ks, toe angle control signals Ktl and Ktr, and camber angle control signals Kcl and Kcr from the controller 10. When the driving circuit 40 receives the control signals Ks, Ktl, Ktr, Kcl, and Kcr, it issues driving signals, which correspond to the control signal values, to the solenoid control valves 26 so that the actuators 5 and 8 of each suspension 1, are driven to set the caster angle (trail), toe angle, and camber angle of each wheel to desired values.

When the caster angle is increased, the trail is increased, while the trail is decreased when the caster angle is decreased. Accordingly, the controller 10 adjusts the caster angle to adjust the trail.

The controller 10 mainly incorporates a memory such as ROM and RAM, a central processing unit, I/O unit, and a counter which serves as a timer (none of which is shown). Electrically connected to the input side of the controller 10 are various sensors including displacement sensors 39, a car speed sensor 41, a steering wheel angle sensor 42, a lateral G sensor 43, and a shift sensor 44. These sensors 39 through 44 supply detection signals to the controller 10.

The car speed sensor 41 is a sensor which detects the car speed V. The steering wheel angle sensor 42 is installed on the steering shaft, which is not shown, and it detects the steering wheel angle H. The lateral G sensor 43 is a sensor which detects the lateral acceleration G which acts on the vehicle in the crosswise direction of the car body. The shift sensor 44 is provided in a specified position on a transmission, which is not shown, and it detects a selected speed change gear.

The controller 10 operates the driving circuit 40 in accordance with the detection signals received from the sensors, and drives the actuator mechanisms 5 and 8 for the individual wheels to control the caster angles (trails), toe angles, and camber angles of the individual wheels.

The memory of the controller 10 primarily stores the alignment control routine, the toe angle control signal deciding subroutine, and the camber angle control signal deciding subroutine. The toe angle control signal deciding subroutine and the camber angle control signal deciding subroutine are executed in the steps of the alignment control routine.

The following describes the routines for controlling the toe angle and camber angle of the front wheels 2. The same routine as that for controlling the toe angle and the like of the front wheels 2 is executed when controlling the toe angle of the rear wheels. Accordingly, the control of the toe angle and the like of the rear wheels can be easily presumed from the control of the toe angle and the like of the front wheels 2; therefore, the explanation of the control routine for the toe angle and the like of the rear wheels will be omitted.

First, the alignment control routine for the front wheels 2 will be explained.

Figure 5:
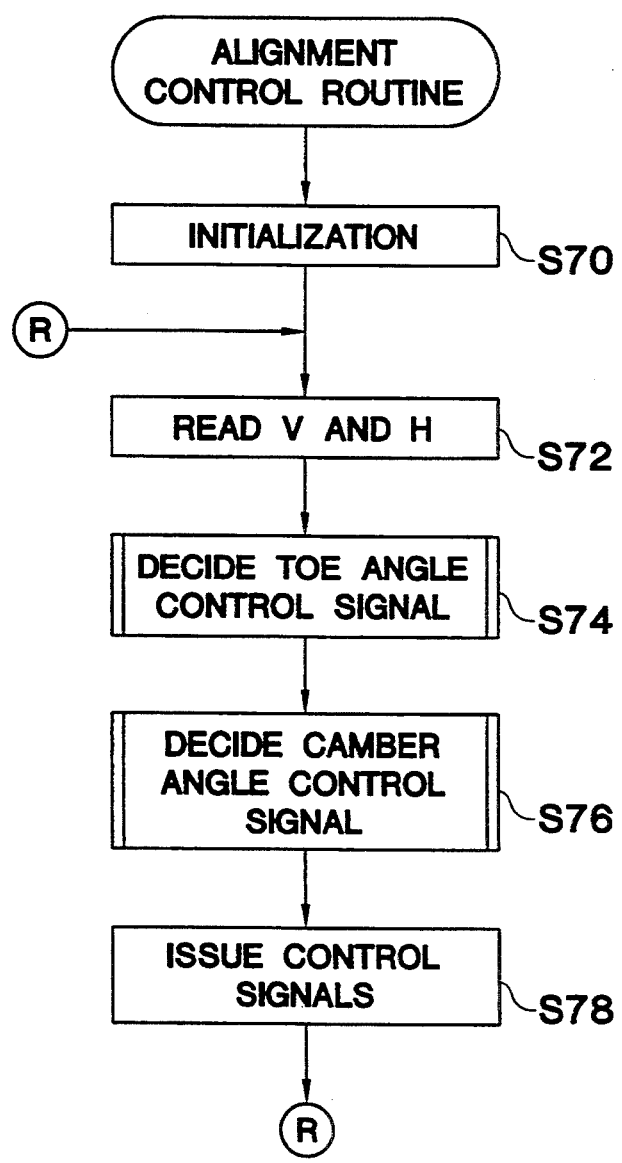
FIG. 5 is a flowchart of an alignment control routine implemented by a controller 10 of FIG. 3 and FIG. 4.

In a step S70 of FIG. 5, the controller 10 initializes all control signal values and control variables. Specifically, the controller sets the toe angle control signal values Ktl and Ktr and the camber angle control signal values Kcl and Kcr to a value "10," and all the steering wheel angle correction values K1$\theta$ and K2$\theta$, K3$\theta$, and K4$\theta$, the car speed correction values K1V, K2V, K3V, and K4V, and the control gains K1$\theta'$, K3$\theta'$, and K4$\theta'$ to a value "0."

The controller 10 then proceeds to a step S72 to read the car speed V, the steering wheel angle H, and the lateral acceleration G, and goes to a step S74. In the step S74, the controller implements the toe angle control signal deciding subroutine shown in FIG. 6 and FIG. 7 to decide the left front wheel toe angle control signal value Ktl and the right front wheel toe angle control signal value Ktr.

Figure 6:
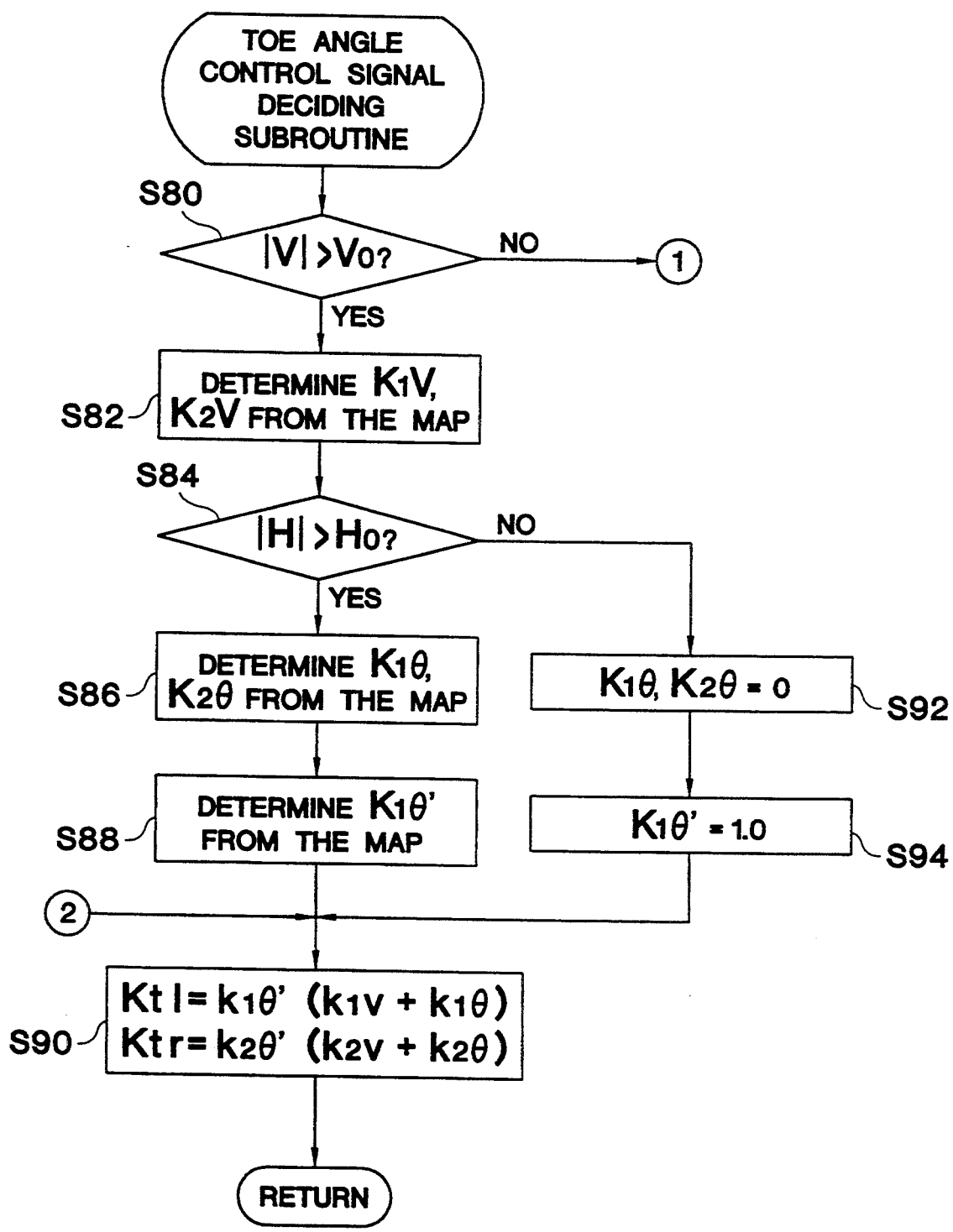
FIG. 6 is a part of the flowchart of a toe angle control signal deciding routine implemented by the controller 10 of FIG. 3 and FIG. 4.

In a step S80 of FIG. 6, the controller determines whether the absolute value of the car speed V is greater than a specified value Vo. The specified value Vo is, for instance, a speed near 0km/h, and if the absolute value of the car speed V is the specified value Vo or less, then it can be regarded that the vehicle is in a stop state. Accordingly, the judgment result while the vehicle is traveling is affirmative, causing the controller 10 to proceed to a step S82. In the step S82, the controller 10 determines the car speed correction values K1V and K2V from their relationship with the car speed V. In this case, K1V is the car speed correction value for the left front wheel, while K2V is the car speed correction value for the right front wheel.

Figure 10:
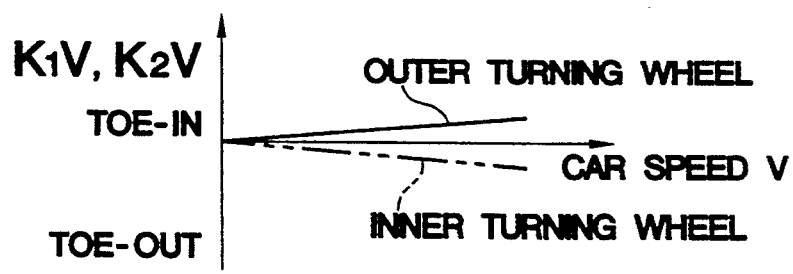
FIG. 10 is a graph showing the relationship between a car speed V and car speed correction values K1V and K2V, which is referred to in a step S82 of FIG. 6.

FIG. 10 is a conceptual view of the map which shows the relationship between the car speed correction values K1V and K2V and the car speed V. In general, when a vehicle is traveling on the same turning track, the lateral acceleration speed G increases as the car speed V increases. As shown in FIG. 10, the car speed correction values K1V and K2V are set so that they gradually increase as the car speed V increases in the toe-in direction for outer turning wheels or in the toe-out direction for inner turning wheels. Thus, the front wheels 2 can be slightly moved in the turning direction in accordance with the car speed V associated with the lateral acceleration G.

The controller 10 then proceeds to a step S84 and determines whether the absolute value of the steering wheel angle H is greater than a specified value Ho. The specified value Ho is, for example, an angle close to zero degree, and if the absolute value of the steering wheel angle H is the specified value Ho or less, then it can be regarded that steering is not being performed. Therefore, when steering is being performed and the absolute value of the steering wheel angle H is greater than the specified value Ho, the controller 10 advances to a step S86 and determines the steering wheel angle correction values K1$\theta$ and K2$\theta$ from their relationship with the steering wheel angle H. In this case, K1$\theta$ is the steering wheel angle correction value for the left front wheel, while K2$\theta$ is the steering wheel angle correction value for the right front wheel.

Figure 11:
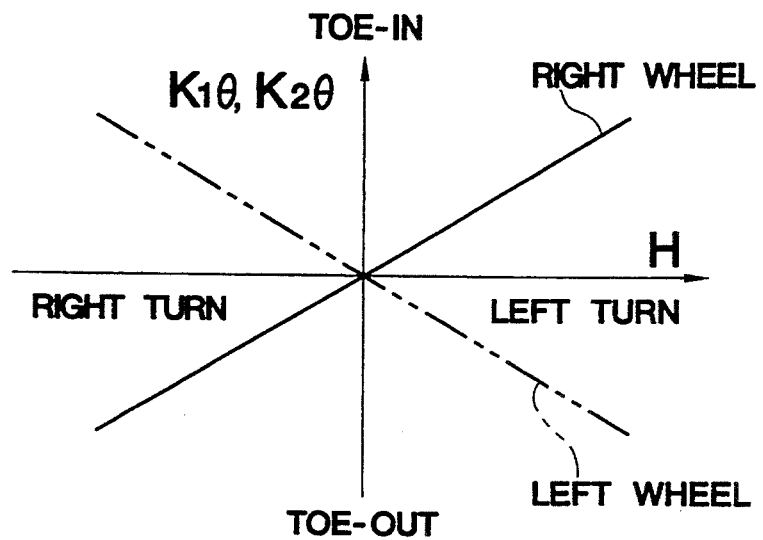
FIG. 11 is a graph showing the relationship between a steering wheel angle H and steering wheel angle correction values $K1\theta$ and $K2\theta$, which is referred to in a step S86 of FIG. 6 and a step S104 of FIG. 7.

FIG. 11 is a conceptual map which shows the relationship between the steering wheel angle correction values K1$\theta$ and K2$\theta$ and the steering wheel angle H. As shown by the two-dot chain line in FIG. 11, the steering wheel angle correction value K1$\theta$ for the left front wheel increases toward the toe-out side for a left turn in which the left front wheel becomes an inner turning wheel, while it increases toward the toe-in side for a right turn in which the left front wheel becomes an outer turning wheel. Further, as shown by the solid line in FIG. 11, the steering wheel angle correction value K2$\theta$ for the right front wheel increases toward the toe-in side for a left turn in which the right front wheel becomes an outer turning wheel, while it increases toward the toe-out side for a right turn in which the right front wheel becomes an inner turning wheel. This makes it possible to change the toe angle of a front wheel, which becomes an inner turning wheel, in the toe-out direction and the toe angle of a front wheel, which becomes an outer turning wheel, in the toe-in direction.

After determining the steering wheel angle correction values K1$\theta$ and K2$\theta$, the controller 10 advances to a step S88.

Figure 12:
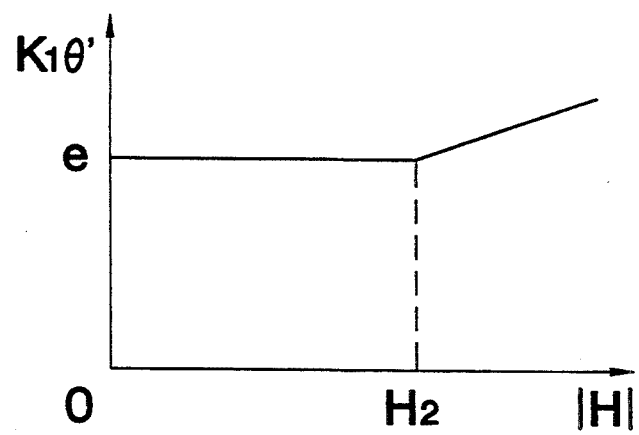
FIG. 12 is a graph showing the relationship between the absolute values of the steering wheel angle H and a control gain $K1\theta'$, which is referred to in a step S88 of FIG. 6.

In the step S88, the controller 10 determines the control gain K1$\theta'$ from its relationship with the absolute value of the steering wheel angle H. FIG. 12 is a conceptual map which shows the relationship between the control gain K1$\theta'$ and the absolute values of the steering wheel angle H. The control gain K1$\theta'$ is set to a specified value "e" (e.g., 1.0) when the steering wheel angle H is a specified value H2 (e.g., 180°) or less; it gradually increases as the steering wheel angle H increases when the steering wheel angle H exceeds the specified value H2. This makes it possible to greatly change the toe angle when the vehicle is subjected to steering at a great angle, and also prevents the toe angle from changing greatly for small steering angles.

After that, the controller 10 goes to a step S90 wherein it determines the toe angle control signal values Ktl and Ktr, where Ktl is the toe angle control signal value for the left front wheel and Ktr is the toe angle control signal value for the right front wheel. The toe angle control signal value Ktl (Ktr) is determined by multiplying the sum of the car speed correction value K1V (K2V) and the steering wheel angle correction value K1$\theta$ (K2$\theta$) by the control gain K1$\theta'$.

Thus, if the vehicle is turning while traveling (if the judgment results of both steps S80 and S84 are affirmative), then the toe angle control signal values Ktl and Ktr, which match the car speed V and the steering wheel angle H, are obtained.

In the step S84, if there is no steering and the absolute value of the steering wheel angle H is smaller than the specified value Ho, then the controller 10 advances to a step S92 and substitutes the value "0" for the steering wheel angle correction values $K1\theta$ and $K2\theta$. Hence, during straight-line travel, the toe angle control signal values Ktl and Ktr are not influenced by the steering wheel angle correction values $K1\theta$ and $K2\theta$ which are associated with the steering wheel angle H. Then the controller 10 proceeds to a step S94 wherein it sets the control gain $K1\theta'$ to a value "1.0." This prevents the toe angle control signal values Ktl and Ktr from being influenced by the control gain $K1\theta'$.

After that, the controller 10 proceeds to the step S90 wherein it determines the toe angle control signal values Ktl and Ktr. Thus, when the vehicle is traveling straight ahead (when the judgment result of the step S80 is affirmative and the judgment result of the step S84 is negative), the toe angle control signal values Ktl and Ktr, which are related only to the car speed V, are obtained.

Figure 7:
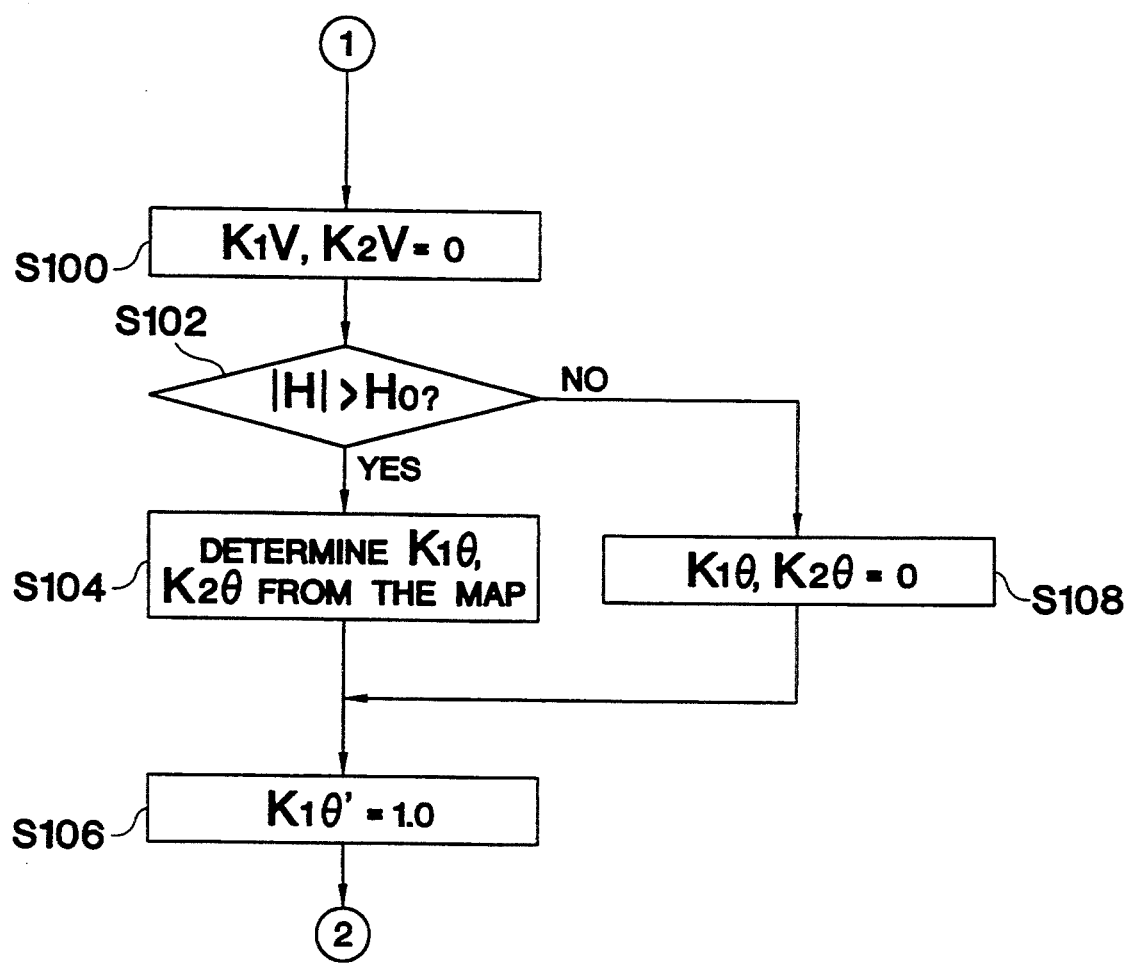
FIG. 7 is the remaining part of the flowchart, which is continued from FIG. 6, of the toe angle control signal deciding routine implemented by the controller 10 of FIG. 3 and FIG. 4.

In the step S80, if the car speed V is the specified value Vo or less and the vehicle is in a stop state, then the judgment result is negative; therefore, the controller 10 goes to a step S100 shown in FIG. 7. In this step S100, the controller 10 sets the car speed correction values K1V and K2V to the value "0." Then the controller 10 proceeds to a step S102 wherein it determines whether the absolute value of the steering wheel angle H is greater than the specified value Ho.

If the controller finds that steering is being performed and the absolute value of the steering wheel angle H is greater than the specified value Ho, then the controller 10 proceeds to a step S104 to determine the steering wheel angle correction values $K1\theta$ and $K2\theta$ from their relationship with the steering wheel angle H in accordance with the aforesaid map shown in FIG. 11.

The controller 10 then proceeds to a step S106 wherein it sets the control gain $K1\theta'$ to the value "1.0." This protects the toe angle control signal values Ktl and Ktr from being influenced by the control gain $K1\theta'$.

After that, the controller 10 advances to the step S90 shown in FIG. 6 to determine the toe angle control signals Ktl and Ktr. Thus, if the steering wheel is turned while the vehicle is kept stopped (if the judgment result of the step S80 is negative and the judgment result of the step S102 is affirmative), then the toe angle control signals Ktl and Ktr, which match the steering wheel angle H, are obtained.

In the step S102, if the controller 10 finds that no steering is being performed and the absolute value of the steering wheel angle H is smaller than the specified value Ho, then the controller goes to a step S108 wherein it sets the steering wheel angle correction values $K1\theta$ and $K2\theta$ to the value "0," and executes the step S106 before it proceeds further to the step S90 of FIG. 6. Thus, if the vehicle is in a stop state with no steering (if the judgment results of both steps S80 and S102 are negative), then the toe angle control signal values Ktl and Ktr, each of which is obtained by multiplying the sum (value 0) of the car speed correction value K1V, K2V (value 0) and the steering wheel angle correction value $K1\theta$, $K2\theta$ (value 0) by the control gain $K1\theta'$ (value 1.0), are set to the value "0."

The controller 10 determines the toe angle control signal values Ktl and Ktr in the step S90, then goes back to the step S76 of FIG. 5.

Figure 8:
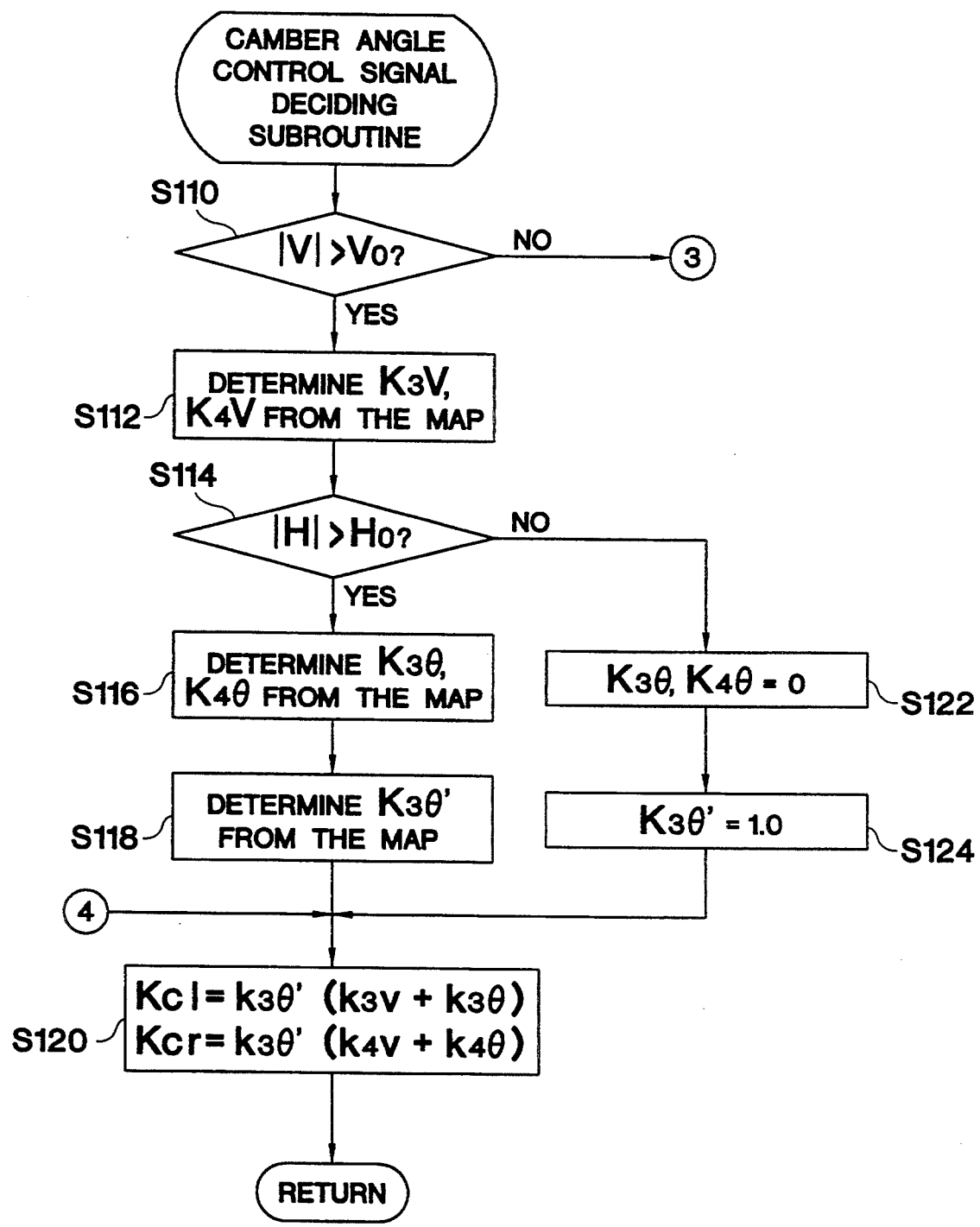
FIG. 8 is a part of the flowchart of a camber angle control signal deciding routine implemented by the controller 10 of FIG. 3 and FIG. 4.
Figure 9:
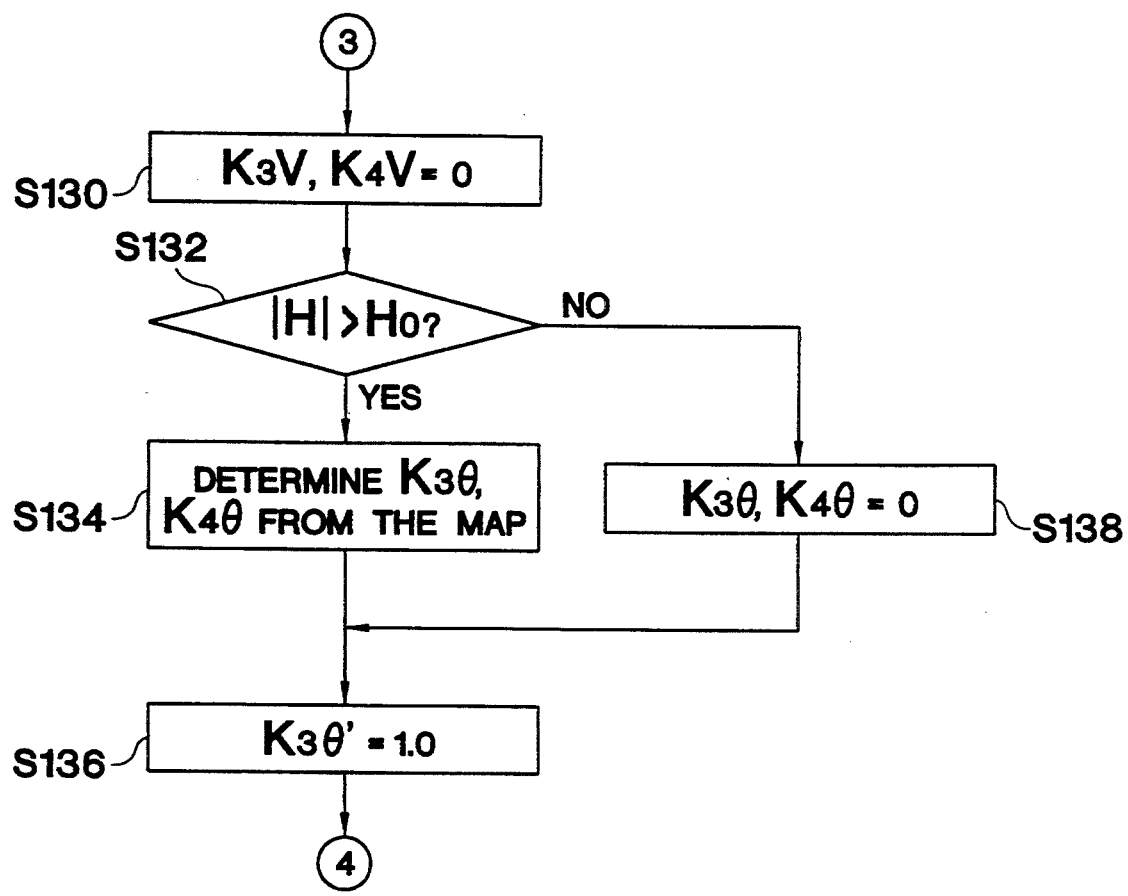
FIG. 9 is the remaining part of the flowchart, which is continued from FIG. 8, of the camber angle control signal deciding routine implemented by the controller 10 of FIG. 3 and FIG. 4.

In the step S76, the controller executes the camber angle control signal deciding subroutine shown in FIG. 8 and FIG. 9 to decide the camber angle control signal value Kcl for the left front wheel and the camber angle control signal value Kcr for the right front wheel.

In a step S110 of FIG. 8, the controller determines whether the absolute value of the car speed V is greater than the specified value Vo. The judgment result is affirmative when the vehicle is traveling; therefore, the controller 10 proceeds to a step S112. In the step S112, the controller 10 determines the car speed correction values K3V and K4V from their relationship with the car speed V, where K3V is the car speed correction value for the left front wheel and K4V is the car speed correction value for the right front wheel.

Figure 13:
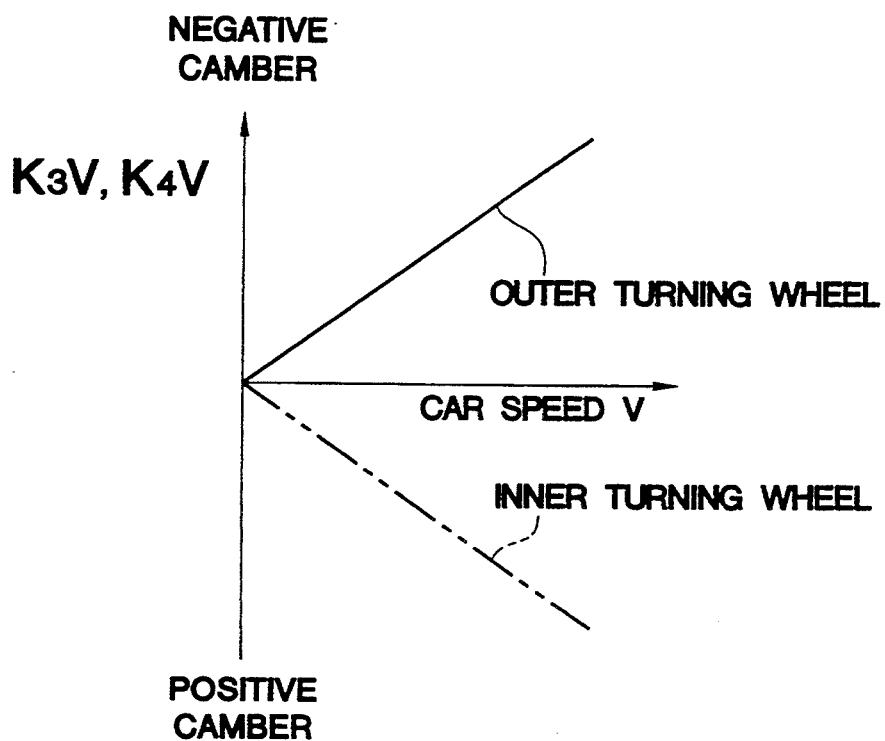
FIG. 13 is a graph showing the relationship between the car speed V and car speed correction values K3V and K4V, which is referred to in a step S112 of FIG. 8.

FIG. 13 is a conceptual map which shows the relationship between the car speed correction values K3V and K4V and the car speed V. In general, when a vehicle is traveling on the same turning track, the lateral acceleration G increases as the car speed V increases. As illustrated in FIG. 13, the car speed correction values K3V and K4V are preset so that they gradually increase in the negative direction for an outer turning wheel but in the positive direction for an inner turning wheel as the car speed V increases. When the lateral acceleration G is large, it is assumed that the car body will undergo significant rolling. When the car speed V related to the lateral acceleration G is high and the rolling of the car body is large, the front wheels 2 are tilted inward with respect to the car body but are raised with respect to the road surface, thereby improving the contact with the ground.

Next, the controller 10 goes to a step S114 wherein it determines whether the absolute value of the steering wheel angle H is greater than the specified value Ho. If the controller 10 finds that steering is being performed and the absolute value of the steering wheel angle H is greater than the specified value Ho, then the controller 10 proceeds to a step S116 wherein it determines the steering wheel angle correction values $K3\theta$ and $K4\theta$ from their relationship with the steering wheel angle H, where $K3\theta$ is the steering wheel angle correction value for the left front wheel and $K4\theta$ is the steering wheel angle correction value for the right front wheel.

Figure 14:
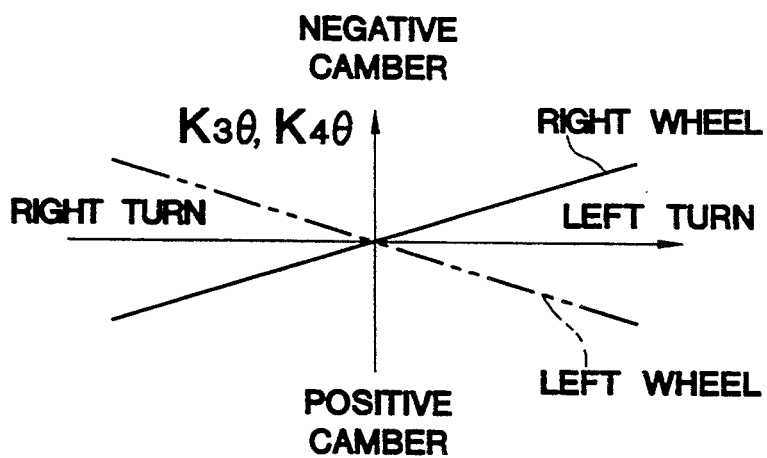
FIG. 14 is a graph showing the relationship between the steering wheel angle H and steering wheel angle correction values $K3\theta$ and $K4\theta$, which is referred to in a step S116 of FIG. 8 and a step S134 of FIG. 9.

FIG. 14 is a conceptual map which shows the relationship between the steering wheel angle correction values $K3\theta$ and $K4\theta$ and the steering wheel angle H. As shown by the two-dot chain line in FIG. 14, the steering wheel angle correction value $K3\theta$ for the left front wheel increases in the positive direction for a left turn in which the left front wheel becomes an inner turning wheel, while it increases in the negative direction for a right turn in which the left front wheel becomes an outer turning wheel. Further, as shown by the solid line in FIG. 14, the steering wheel angle correction value $K4\theta$ for the right front wheel increases in the negative direction for a left turn in which the right front wheel becomes an outer turning wheel, while it increases in the positive direction for a right turn in which the right front wheel becomes an inner turning wheel. This makes it possible to change the camber angle of a front wheel, which becomes an inner turning wheel, in the positive direction with respect to the car body and the camber angle of a front wheel, which becomes an outer turning wheel, in the negative direction with respect to the car body.

After determining the steering wheel angle correction angles K3θ and K4θ, the controller 10 advances to a step S118.

Figure 15:
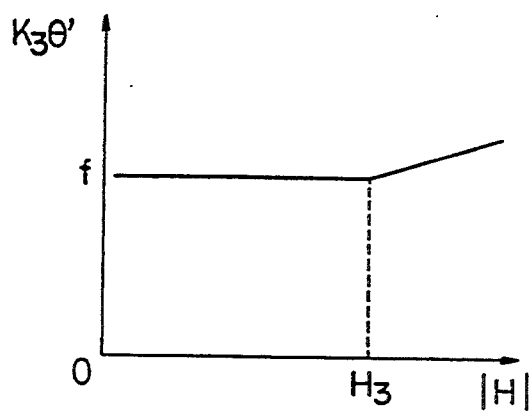
FIG. 15 is a graph showing the relationship between the absolute values of the steering wheel angle H and a control gain $K3\theta'$, which is referred to in a step S118 of FIG. 8.

In the step S118, the controller 10 determines the control gain K3θ' from its relationship with the absolute value of the steering wheel angle H. FIG. 15 is a conceptual map which shows the relationship between the control gain K3θ' and the absolute values of the steering wheel angle H. The control gain K3θ' is set to a specified value "f" (e.g., 1.0) when the steering wheel angle H is a specified value H3 (e.g., 180°) or less; it gradually increases as the steering wheel angle H increases when the steering wheel angle H exceeds the specified value H3. This makes it possible to greatly change the camber angle when the vehicle is subjected to steering at a great angle.

After that, the controller 10 goes to a step S120 wherein it determines the camber angle control signal values Kcl and Kcr, where Kcl is the camber angle control signal value for the left front wheel and Kcr is the camber angle control signal value for the right front wheel. The camber angle control signal values Kcl (Kcr) is determined by multiplying the sum of the car speed correction value K3V (K4V) and the steering wheel angle correction value K3θ (K4θ) by the control gain K3θ'.

Thus, if the vehicle is turning while traveling (if the judgment results of both steps S110 and S114 are affirmative), then the camber angle control signal values Kcl and Kcr, which match the car speed V and the steering wheel angle H, are obtained.

In the step S114, if there is no steering and the absolute value of the steering wheel angle H is smaller than the specified value Ho, then the controller 10 advances to a step S122 and substitutes the value "0" for the steering wheel angle correction values K3θ and K4θ. Hence, during straight-line travel, the camber angle control signal values Kcl and Kcr are not influenced by the steering wheel angle correction values K3θ and K4θ which are associated with the steering wheel angle H. Then the controller 10 proceeds to a step S124 wherein it sets the control gain K3θ' to the value "1.0." This protects the camber angle control signal values Kcl and Kcr from being influenced by the control gain K3θ'.

After that, the controller 10 proceeds to the step S120 wherein it determines the camber angle control signal values Kcl and Kcr. Thus, when the vehicle is traveling straight (when the judgment result of the step S110 is affirmative and the judgment result of the step S114 is negative), the camber angle control signal values Kcl and Kcr, which are related only to the car speed V, are obtained.

In the step S110, if the car speed V is the specified value Vo or less and the vehicle is in a stop state, then the judgment result is negative; therefore, the controller 10 goes to a step S130 shown in FIG. 9. In this step S130, the controller 10 sets the car speed correction values K3V and K4V to the value "0." Then the controller 10 proceeds to a step S132 wherein it determines whether the absolute value of the steering wheel angle H is greater than the specified value Ho.

If the controller finds that steering is being performed and the absolute value of the steering wheel angle H is greater than the specified value Ho, then the controller 10 proceeds to a step S134 to determine the steering wheel angle correction values K3θ and K4θ from their relationship with the steering wheel angle H in accordance with the aforesaid map shown in FIG. 14.

The controller 10 then proceeds to a step S136 wherein it sets the control gain K3θ' to the value "1.0." This protects the camber angle control signal values Kcl and Kcr from being influenced by the control gain K3θ'.

After that, the controller 10 advances to the step S120 shown in FIG. 8 to determine the camber angle control signal values Kcl and Kcr. Thus, if the steering wheel is turned while the vehicle is kept in a stop state (if the judgment result of the step S110 is negative and the judgment result of the step S132 is affirmative), then the camber angle control signal values Kcl and Kcr, which match only the steering wheel angle H, are obtained.

In the step S132, if the controller 10 finds that no steering is being performed and the absolute value of the steering wheel angle H is smaller than the specified value Ho, then the controller goes to a step S138 wherein it sets the steering wheel angle correction values K3θ and K4θ to the value "0" and executes the step S136 before it proceeds further to the step S120 of FIG. 8. Thus, if the vehicle is in a stop state with no steering (if the judgment results of both steps S110 and S132 are negative), then the camber angle control signal values Kcl and Kcr, each of which is obtained by multiplying the sum (value 0) of the car speed correction value K3V, K4V (value 0) and the steering wheel angle correction value K3θ, K4θ (value 0) by the control gain K3θ' (value 1.0), are set to the value "0."

After the controller 10 determines the camber angle control signals Kcl and Kcr in the step S120, it goes back to the step S78 of FIG. 5.

In the step S78, the controller 10 issues the toe angle control signal values Ktl and Ktr and the camber angle control signal values Kcl and Kcr to the driving circuit 40. This causes the driving circuit 40 to operate the solenoid control valves 26 and drive the actuator mechanisms 5 and 8 of the suspensions 1 in accordance with the control signal values Ktl, Ktr, Kcl, and Kcr. Thus, the camber angles and toe angles of the front wheels 2 are set to the desired values.

After implementing the step S78, the controller 10 goes back to the step S72 wherein it repeatedly carries out the control routine to control the toe angles and the camber angles of the front wheels 2 in accordance with the driving conditions of the vehicle.

In this case, while the vehicle is traveling, the control gains K1θ' and K3θ', which are the multipliers for calculating the control signal values Ktl, Ktr, Kcl, and Kcr, are set at larger values when the absolute value of the steering wheel angle H is greater than the specified values H2 and H3 and, in addition, they gradually increase as the steering wheel angle H increases. Hence, when large-angle steering is made while the vehicle is traveling, the control signal values Ktl, Ktr, Kcl, and Kcr all take larger values, and they take further larger values as the steering amount increases.

When the control signal values Ktl, Ktr, Kcl, and Kcr increase, the toe angles of the front wheels 2 are changed in the toe-out direction for the inner turning front wheel or in the toe-in direction for the outer turning front wheel. In addition, the camber angles of the front wheels 2 with respect to the car body are changed in the positive direction for the inner turning front wheel or in the negative direction for the outer turning front wheel. Therefore, when a driver makes a large-angle steering while driving, the orientation of the front wheels 2 changes not only from the steering but also from the toe angle change. Furthermore, the change in the camber angle causes a change in the camber thrust of the front wheels 2.

Figure 16:
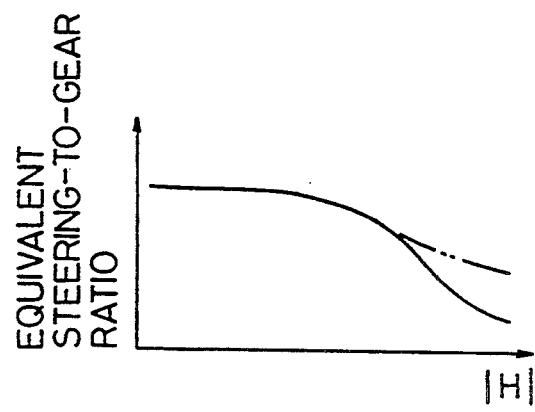
FIG. 16 is a graph showing the relationship between the absolute values of the steering wheel angle H and equivalent steering-to-gear ratio, which is obtained when the alignment control method according to the present invention is carried out.

Thus, the change in the orientation of the front wheels 2 with respect to the steering amount substantially increases in an area where the steering wheel angle H is large, so that the equivalent steering-to-gear ratio decreases, as shown by the solid line in FIG. 16,.

Figure 17:
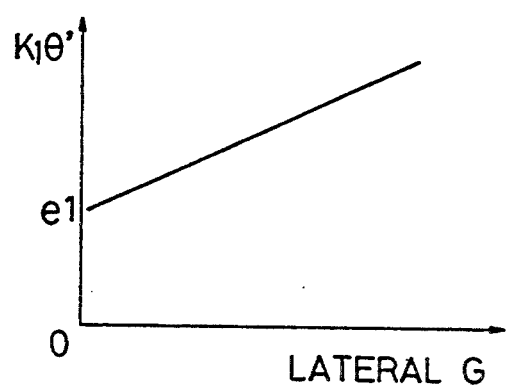
FIG. 17 is a graph showing the relationship between a lateral acceleration G and the control gain $K1\theta'$, which is used in the step S88 of FIG. 6 when the control gain $K1\theta'$ is set in accordance with the lateral acceleration G in place of the steering wheel angle H.

In the aforesaid step S88 of FIG. 6, the control gain $K1\theta'$ may be determined by the lateral acceleration G in place of the steering wheel angle H. In this case, the controller 10 calculates the control gain $K1\theta'$, which matches the lateral acceleration G, from the map which shows the relationship between the control gain $K1\theta'$ and the lateral acceleration G shown in FIG. 17. As shown in FIG. 17, the control gain $K1\theta'$ is set so that it increases from a specified value e1 (e.g., 1.0) as the lateral acceleration G increases. This makes it possible to obtain toe angle control signal values Ktl and Ktr, which match the lateral acceleration G related to the car speed V and the steering wheel angle H when the vehicle is making a turn while traveling (when the judgment results of both steps S80 and S84 are affirmative).

Figure 18:
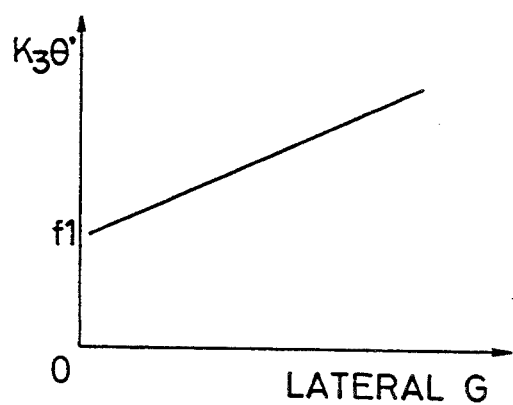
FIG. 18 is a graph showing the relationship between a lateral acceleration G and the control gain $K3\theta'$, which is used in the step S118 of FIG. 8 when the control gain $K3\theta'$ is set in accordance with the lateral acceleration G in place of the steering wheel angle H.

In the aforesaid step S118 of FIG. 8, the control gain $K3\theta'$ can be determined by the lateral acceleration G in place of the steering wheel angle H. In this case, the controller 10 calculates the control gain $K3\theta'$, which matches the lateral acceleration G, from the map which shows the relationship between the control gain $K3\theta'$ and the lateral acceleration G shown in FIG. 18. As shown in FIG. 18, the control gain $K3\theta'$ is set so that it increases from a specified value f1 (e.g., 1.0) as the lateral acceleration G increases. This makes it possible to obtain camber angle control signal values Kcl and Kcr, which match the increase in the lateral acceleration G related to the car speed V and the steering wheel angle H when the vehicle is making a turn while traveling (when the judgment results of both steps S110 and S114 are affirmative), thereby allowing the camber angle to be changed greatly.

Thus, the control gains $K1\theta'$ and $K3\theta'$ are set so that they increases as the lateral acceleration G increases, and therefore, the control signal values Ktl, Ktr, Kcl, and Kcr also increase as the lateral acceleration G increases. An increase in the control signal values Ktl, Ktr, Kcl, and Kcr causes the toe angle of the front wheels 2 to change in the toe-out direction for the inner turning front wheel or to change in the toe-in direction for the outer turning front wheel. Likewise, the camber angle of the front wheels 2 with respect to the car body changes in the positive direction for the inner turning front wheel or in the negative direction for the outer turning front wheel.

Hence, the orientation of the front wheels 2 changes not only from the steering but also from the change of the toe angle, thus substantially increasing the change of the orientation of the front wheels 2 with respect to the steering amount. Furthermore, the change in the camber angle increases the camber thrust that takes place in the front wheels 2. As a result, the equivalent steering-to-gear ratio can be reduced and a high-speed turn can be made with an approximately identical steering amount to that for making a low-speed turn without being influenced by the turning speed. This enables improved high-speed turning performance and "operating performance" of a vehicle.

When backing a vehicle, the car speed is lower than that when driving it forward; therefore, the steering wheel operability at the time of making a turn should be improved even if traveling stability is slightly sacrificed. In general, the steering wheel operability of a vehicle at the time of making a turn can be improved by setting the steering-to-gear ratio of a vehicle at a small value and also setting the absolute value of the trail of a suspension to a small value. To be specific, setting the steering-to-gear ratio to a small value increases the change in the orientation of the wheels with respect to a steering amount and decreases the amount of steering by a driver, thus improving the steering wheel operability at the time of making a turn. In addition, setting the absolute value of the trail to a small value controls the "restoring torque" which is generated around the virtual king pin axis of the suspension; therefore, the required steering-operation force or steering-hold force at the time of turning is decreased, leading to improved steering wheel operability when making a turn.

On the other hand, however, setting the steering-to-gear ratio to a small value means that slight steering will cause a significant change in the orientation of the wheels. Likewise, setting the absolute value of the trail to a small value means a decreased restoring torque around the virtual king pin axis, leading to deteriorated straight-line traveling stability. For this reason, an alignment control unit, which is capable of improving the steering wheel operability for making a turn when backing a vehicle without sacrificing good straight-line traveling stability for driving the vehicle forward, is called for.

Figure 19:
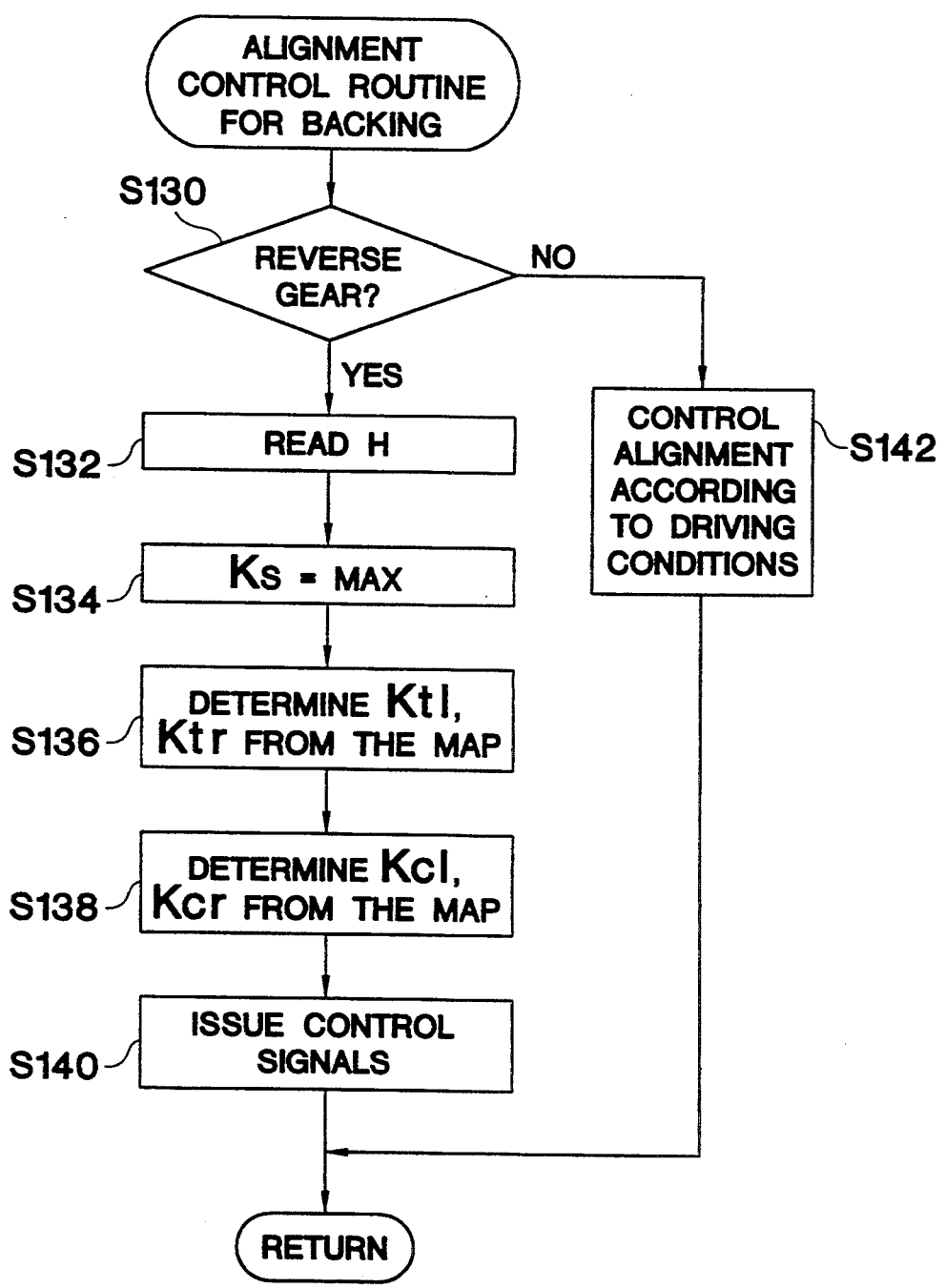
FIG. 19 is a flowchart of an alignment control routine implemented by the controller 10 of FIG. 3 and FIG. 4 for backing.
Figure 20:
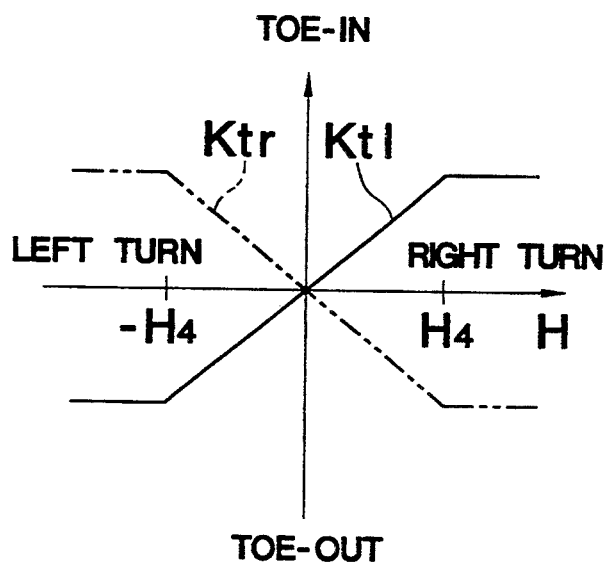
FIG. 20 is a graph showing the relationship between the steering wheel angle H and control signals Ktl and Ktr, which is referred to in a step S136 of FIG. 19.
Figure 21:
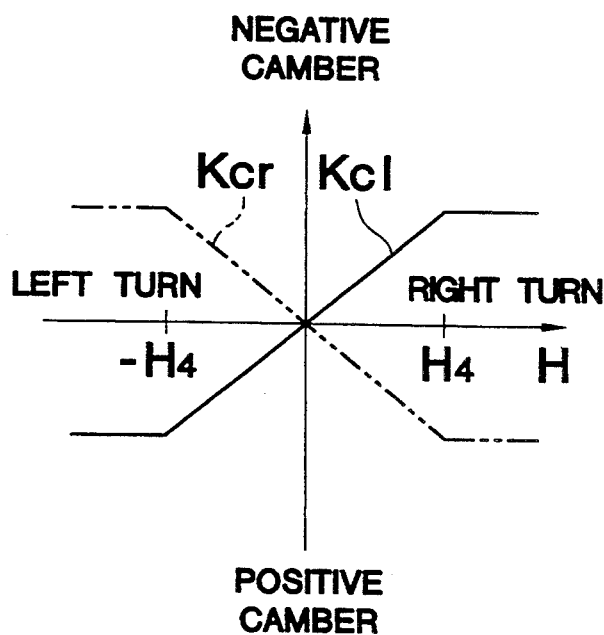
FIG. 21 is a graph showing the relationship between the steering wheel angle H and control signals Kcl and Kcr, which is referred to in a step S138 of FIG. 19.

FIG. 19 through FIG. 21 are used for explaining the alignment control method for improving the steering wheel operability for making a turn when backing a vehicle. The following describes the alignment control routine used to control alignment of the suspensions 1 for the front wheels when the vehicle is backed. The same routine as that for controlling the alignment of the suspensions 1 for the front wheels is implemented for controlling the suspensions 1 for the rear wheels. Hence, the explanation of the control routine for the alignment of the suspensions 1 for the rear wheels will be omitted.

The controller 10 interrupt-executes the alignment control routine for backing a vehicle shown in FIG. 19 at intervals of a specified cycle. First, in a step S130, the controller determines whether the gear of the transmission (not shown) has been set in the reverse position. The controller 10 constantly monitors the selected position of the transmission gear through the shift sensor 44.

If the transmission gear has been set in the reverse position, then the judgment result of the step S130 becomes affirmative (Yes), causing the controller 10 to go to a step S132 to read the steering wheel angle H. Then the controller 10 goes to a step S134 wherein it sets a caster angle control signal value Ks to a specified value MAX. The specified value MAX is the maximum value for the caster angle control signal value Ks. Setting the caster angle control signal value Ks to the specified value MAX minimizes the caster angle of the suspension 1 and also minimizes the absolute value of the trail.

After that, the controller 10 advances to a step S136 wherein it calculates the toe angle control signal values Ktl and Ktr which match the read steering wheel angle H, where Ktl is the toe angle control signal value for the left front wheel and Ktr is the toe angle control signal value for the right front wheel.

FIG. 20 shows a concept of the relationship between the steering wheel angle H and the toe angle control signal values Ktl and Ktr. As shown by the solid line in FIG. 20, the toe angle control signal value Ktl increases toward the toe-in side in the case of a right turn in which the left front wheel becomes the outer turning wheel or toward the toe-out side in the case of a left turn in which the left front wheel becomes the inner turning wheel. Once the absolute value of the steering wheel angle H reaches a specified value H4 (e.g., 90°), the toe angle control signal value Ktl is maintained at a constant value. Likewise, as shown by the two-dot chain line in FIG. 20, the toe angle control signal value Ktr increases toward the toe-in side in the case of a left turn in which the right front wheel becomes the outer turning wheel or toward the toe-out side in the case of a right turn in which the right front wheel becomes the inner turning wheel. Once the absolute value of the steering wheel angle H reaches the specified value H4, the toe angle control signal value Ktr is maintained at a constant value. When the steering wheel angle H is the value "0," the actuator mechanisms 5 and 8 are in their neutral position, the toe angle, camber angle, and caster angle being set in their reference angle positions.

Thus, the toe angles can be changed greatly as the steering amount increases, while preventing the toe angles from varying too much.

The controller 10 then proceeds to a step S138 wherein it determines the camber angle control signal values Kcl and Kcr from their relationship with the steering wheel angle, where Kcl is the camber angle control signal value for the left front wheel and Kcr is the camber angle control signal value for the right front wheel.

FIG. 21 shows a concept of the relationship between the steering wheel angle H and the camber angle control signal values Kcl and Kcr. As shown by the solid line in FIG. 21, the camber angle control signal value Kcl increases toward the negative camber side in the case of a right turn in which the left front wheel becomes the outer turning wheel or toward the positive camber side in the case of a left turn in which the left front wheel becomes the inner turning wheel. Once the absolute value of the steering wheel angle H reaches the specified value H4, the camber angle control signal value Ktl is maintained at a constant value. Likewise, as shown by the two-dot chain line in FIG. 21, the camber angle control signal value Kcr increases toward the negative camber side in the case of a left turn in which the right front wheel becomes the outer turning wheel or toward the positive camber side in the case of a right turn in which the right front wheel becomes the inner turning wheel. Once the absolute value of the steering wheel angle H reaches the specified value H4, the camber angle control signal value Kcr is maintained at a constant value.

Thus, the camber angles can be changed greatly as the steering amount increases, while preventing the camber angles from varying too much.

The controller 10 then proceeds to a step S140 wherein it issues the caster angle control signal value Ks, the toe angle control signal values Ktl and Ktr, and the camber angle control signal values Kcl and Kcr to the driving circuit 40. This causes the driving circuit 40 to operate the solenoid control valves 26 and drive the actuator mechanisms 5 and 8 of the suspensions 1 in accordance with the control signal values Ks, Ktl, Ktr, Kcl, and Kcr. Thus, the caster angles (trails) of the suspensions 1, and the toe angle and the camber angle of the front wheels are set to the desired values. After that, the controller 10 terminates the execution of the control routine.

As long as the gear is in the reverse position, the steps of S132 through S140 are repeatedly carried out. The absolute values of the trails of the suspensions 1 are set to minimum values and the restoring torque generated around the virtual king pin axis is suppressed, resulting in reduced steering-operation force and steering-hold force. Further, the toe angles of the front wheels change in the steering direction and causes the orientation of the front wheels to greatly change in cooperation of the steering operation. Accordingly, the change in the orientation of the front wheels with respect to the steering amount increases and the equivalent steering-to-gear ratio decreases as the steering wheel angle H increases. Furthermore, the camber angles of the front wheels change in the turning direction, causing the camber thrust to increase as the steering wheel angle H increases.

On the other hand, if the selected gear position is found to be other than the reverse position in the step S130, then the judgment result is negative (No); therefore, the controller 10 advances from the step S130 to the step S142.

In the step S142, the controller 10 determines the control signal values Ks, Ktl, Ktr, Kcl, and Kcr, which are used when driving forward, according to the method described above, and operates the solenoid control valves 26 in accordance with the values of the determined control signal values Ks, Ktl, Ktr, Kcl, and Kcr, thereby setting the toe angles and camber angles of the front wheels and the caster angles (trails) of the suspensions 1 to the desired values suited for the traveling conditions. This leads to improved traveling stability of a vehicle.

Thus, when the controller detects that the driver has shifted the transmission gear into the reverse position, the controller sets the absolute value of the trail to a minimum value and changes the toe angle in accordance with the steering angle, causing the steering-operation force and steering-hold force during backing to decrease. Further, when the toe angle is changed in the steering angle direction, the equivalent steering-to-gear ratio decreases. This makes it possible to improve the steering wheel operability for making a turn while backing without sacrificing good straight-line traveling stability while driving forward. In addition, the reduced steering-operation force decreases the load on a power steering system especially at the time of turning the steering wheel while the vehicle is kept stopped.

What is claimed is:

1. An automotive suspension alignment control unit for a vehicle for controlling toe angle of a right wheel and a left wheel, respectively, comprising:
   first actuator for controlling a toe angle of said right wheel;
   second actuator for controlling a toe angle of said left wheel;
   a steering angle sensor for detecting a steering angle and a steering direction of the vehicle;
   a car speed sensor for detecting car speed of said vehicle; and
   a controller including,
      basic control amount establishing means for establishing a toe angle correction value for said right and left wheels, respectively, in accordance with said steering angle and the steering direction detected by said steering angle sensor, a toe angle correction amount establishing means for establishing a toe angle correction amount for said right and left wheels, respectively, in accordance with the car speed detected by said car speed sensor, control gain setting means for setting a control gain that increases as said steering angle detected by said steering angle sensor increases, actual control amount establishing means for establishing an actual control amount of said first and second actuators, respectively, by adding said toe angle correction amount and said toe angle correction value, and multiplying by said control gain set by said control gain setting means, and control means for controlling said first and second actuators in accordance with said actual control amount.

2. The automotive suspension alignment control unit of claim 1, wherein said control gain setting means changes the control gain such that said actual control amount of said first and second actuators increase when the detected steering angle detected by said steering angle sensor exceeds a specified value.

3. The automotive suspension alignment control unit of claim 2, wherein the control gain is set to a fixed value when the detected steering angle is equal to or less than a specified value, said control gain being set to a value which gradually increases from said fixed value as the detected steering angle increases after the detected steering angle exceeds said specified value.

4. The automotive suspension alignment control unit of claim 1, wherein, said basic control amount establishing means establishes said toe angle correction value such that said toe angle of one of said right and left wheels in an outer side of a turning circle of the vehicle increases towards a toe-in direction, and said toe angle of the other wheel increases towards a toe-out direction, in accordance with an increase of said detected steering angle.

5. The automotive suspension alignment control unit of claim 1, wherein, said toe angle correction amount establishing means establishes said toe angle correction amount such that said toe angle of one of said right and left wheels in an outer side of a turning circle of the vehicle increases towards a toe-in direction, and said toe angle of the other wheel increases towards a toe-out direction, in accordance with an increase of said detected car speed.

6. An automotive suspension alignment control unit for a vehicle for controlling camber angle of a right wheel and a left wheel, respectively, comprising:

first actuator for controlling a camber angle of said right wheel;

second actuator for controlling a camber angle of said left wheel;

a steering angle sensor for detecting a steering angle and a steering direction of the vehicle;

a car speed sensor for detecting car speed of said vehicle; and a controller including, basic control amount establishing means for establishing a camber angle correction value for said right and left wheels, respectively, in accordance with said steering angle and said steering direction detected by said steering angle sensor, a camber angle correction amount establishing means for establishing a camber angle correction amount for said right and left wheels, respectively, in accordance with the car speed detected by said car speed sensor, control gain setting means for setting a control gain that increases as said steering angle detected by said steering angle sensor increases, actual control amount establishing means for establishing an actual control amount of said first and second actuators, respectively, by adding said camber angle correction amount and said camber angle correction value, and multiplying by said control gain set by said control gain setting means, and control means for controlling said first and second actuators in accordance with said actual control amount.

7. The automotive suspension alignment control unit of claim 6, wherein said control gain setting means changes the control gain such that said actual control amount of said first and second actuators increase when the detected steering angle detected by said steering angle sensor exceeds a specified value.

8. The automotive suspension alignment control unit of claim 7, wherein the control gain is set to a fixed value when the detected steering angle is equal to or less than a specified value, the control gain being set to a value which gradually increases from said fixed value as the detected steering angle increases after the detected steering angle exceeds said specified value.

9. The automotive suspension alignment control unit of claim 6, wherein, said basic control amount establishing means establishes said camber angle correction value such that said camber angle of one of said right and left wheels in an outer side of a turning circle of the vehicle increases towards a negative-camber direction, and said camber angle of the other wheel increases towards a positive-camber direction, in accordance with an increase of said detected steering angle.

10. The automotive suspension alignment control unit of claim 6, wherein, said camber angle correction amount establishing means establishes said camber angle correction amount such that said camber angle of one of said right and left wheels in an outer side of a turning circle of the vehicle increases towards a negative-camber direction, and said toe angle of the other wheel increases towards a positive-camber direction, in accordance with an increase of said detected car speed.

11. An automotive suspension alignment control unit for a vehicle for controlling toe angle of a right wheel and a left wheel, respectively, comprising:

first actuator for controlling a toe angle of said right wheel;

second actuator for controlling a toe angle of said left wheel;

a steering angle sensor for detecting a steering angle and a steering direction of the vehicle;

a car speed sensor for detecting car speed;

a lateral acceleration sensor for detecting lateral acceleration acting on the vehicle in a lateral direction thereof; and a controller including, basic control amount establishing means for establishing a toe angle correction value for said right and left wheels, respectively, in accordance with said steering angle and said steering direction detected by said steering angle sensor, a toe angle correction amount establishing means for establishing a toe angle correction amount for said right and left wheels, respectively, in accordance with the car speed detected by said car speed sensor, control gain setting means for setting a control gain in accordance with said detected lateral acceleration;

actual control amount establishing means for establishing an actual control amount of said first and second actuators based on said basic control amount and said control gain; and control means for controlling said first and second actuators in accordance with said actual control amount.

12. The alignment control unit according to claim 11, wherein said controller controls toe angles of the associated wheels in accordance with the set alignment control amount.

13. The automotive suspension alignment control unit of claim 11, wherein said control gain is set to a value which increases as the detected lateral acceleration increases.

14. An automotive suspension alignment control unit for a vehicle for controlling camber angle of a right wheel and a left wheel, respectively, comprising:

first actuator for controlling a camber angle of said right wheel;

second actuator for controlling a camber angle of said left wheel;

a steering angle sensor for detecting a steering angle and a steering direction of the vehicle;

a car speed sensor for detecting car speed, a lateral acceleration sensor for detecting lateral acceleration acting on the vehicle in a lateral direction thereof; and a controller including, basic control amount establishing means for establishing a camber angle correction value for said right and left wheels, respectively, in accordance with said steering angle and said steering direction detected by said steering angle sensor, a camber angle correction amount establishing means for establishing a camber angle correction amount for said right and left wheels, respectively, in accordance with the car speed detected by said car speed sensor, control gain setting means for setting a control gain in accordance with said detected lateral acceleration;

actual control amount establishing means for establishing an actual control amount of said first and second actuators based on said basic control amount and said control gain; and control means for controlling said first and second actuators in accordance with said actual control amount.

15. The automotive suspension alignment control unit of claim 14, wherein said control gain is set to a value which increases as the detected lateral acceleration increases.

16. An automotive suspension alignment control method for controlling toe angle of a right wheel and a left wheel of a vehicle, comprising the steps of:

detecting a steering angle and a steering direction;

determining a toe angle correction value for said right wheel and said left wheel in accordance with the detected steering angle and the steering direction;

detecting car speed;

setting a toe angle correction amount for said right wheel and said left wheel in accordance with the detected car speed;

determining a control gain in accordance with the detected steering angle such that the control gain is set to have a value which increases as the steering angle increases;

determining an actual control amount of said toe angle by adding said toe angle control correction value and said toe angle correction amount, and multiplying by said control gain; and controlling said toe angle of said right and said left wheel in accordance with said actual control amount.

17. The automotive suspension alignment control method of claim 16, wherein said control gain is set such that the actual control amount increases when the detected steering angle exceeds a specified value.

18. The alignment control method of claim 17, wherein said control gain is set to a fixed value when the detected said steering angle is equal to or less than said specified value and gradually increases from said fixed value as the detected said steering angle exceeds said specified value.

19. The alignment control method of claim 17, wherein said control gain is set such that said actual control amount increases when the detected steering angle exceeds a specified value.

20. The alignment control method of claim 19, wherein said control gain is set to a fixed value when the detected said steering angle is equal to or less than said specified value and gradually increases from said fixed value as the detected said steering angle exceeds said specified value.

21. The automotive suspension alignment control method of claim 16, wherein said step for determining a toe angle correction value comprises the substep of, increasing said toe angle of one of said right and left wheels in an outer side of a turning circle of the vehicle towards a toe-in direction and increasing said toe angle of the other wheel towards a toe-out direction, in accordance with an increase of said detected steering angle.

22. The automotive suspension alignment control method of claim 16, wherein said step for setting a toe angle correction amount comprises the substep of, increasing said toe angle of one of said right and left wheels in an outer side of a turning circle of the vehicle towards a toe-in direction and increasing said toe angle of the other wheel towards a toe-out direction, in accordance with said detected car speed.

23. An automotive suspension alignment control method for controlling toe angle of a right wheel and a left wheel of a vehicle, comprising the steps of:

detecting a steering angle and a steering direction;

determining a camber angle correction value for said right wheel and said left wheel in accordance with the detected steering angle and the steering direction;

detecting car speed;

setting a camber angle correction amount for said right wheel and said left wheel in accordance with the detected car speed;

determining a control gain having a value which is set to a fixed value when the detected said steering angle is equal to or less than a specified value and which gradually increases from said fixed value as the detected said steering angle exceeds said specified value;

determining an actual control amount of said camber angle by adding said camber angle control correction value and said camber angle correction amount, and multiplying by said control gain; and controlling said toe angle of said right and said left wheel in accordance with said actual control amount.

24. The automotive suspension alignment control method of claim 23, wherein said step for determining a camber angle correction value comprises the substep of, increasing said camber angle of one of said right and left wheels in an outer side of a turning circle of the vehicle towards a negative-camber direction and increasing said toe angle of the other wheel towards a positive-camber direction, in accordance with an increase of said detected steering angle.

25. The automotive suspension alignment control method of claim 23, wherein said step for setting a camber angle correction amount comprises the substep of, increasing said camber angle of one of said right and left wheels in an outer side of a turning circle of the vehicle towards a negative-camber direction and increasing said toe angle of the other wheel towards a positive-camber direction, in accordance with an increase of said detected car speed.

26. An automotive suspension alignment control method for controlling toe angle of a right wheel and a left wheel of a vehicle, comprising the steps of:

detecting a steering angle and a steering direction;

determining a toe angle correction value for said right wheel and said left wheel in accordance with the detected steering angle and the steering direction;

detecting car speed;

setting a toe angle correction amount for said right wheel and said left wheel in accordance with the detected car speed;

detecting lateral acceleration acting on the vehicle in a lateral direction of the vehicle;

determining a control gain in accordance with the detected lateral acceleration;

determining an actual control amount of said toe angle by adding said toe angle control correction value and said toe angle correction amount, and multiplying by said control gain; and controlling said toe angle of said right and said left wheel in accordance with said actual control amount.

27. The alignment control method of claim 26, wherein said control gain is set to a value which increases as the lateral acceleration increases.

28. An automotive suspension alignment control method for controlling camber angle of a right wheel and a left wheel of a vehicle, comprising the steps of:

detecting a steering angle and a steering direction;

determining a camber angle correction value for said right wheel and said left wheel in accordance with the detected steering angle and the steering direction;

detecting car speed;

setting a camber angle correction amount for said right wheel and said left wheel in accordance with the detected car speed;

detecting lateral acceleration acting on the vehicle in a lateral direction of the vehicle;

determining a control gain in accordance with the detected lateral acceleration such that the control gain is set to a value which increases as the lateral acceleration increases;

determining an actual control amount of said camber angle by adding said toe angle control correction value and said camber angle correction amount, and multiplying by said control gain; and controlling said camber angle of said right and said left wheels in accordance with said actual control amount.

29. The alignment control method of claim 28, wherein said control gain is set to a value which increases as the lateral acceleration increases.

30. The alignment control method of claim 29, wherein said control gain is set to a value which increases as the lateral acceleration increases.

31. An automotive suspension alignment control unit for a vehicle for controlling a toe angle and a camber angle of a right wheel and a left wheel, respectively, comprising:

first actuator for controlling a toe angle and a camber angle of said right wheel;

second actuator for controlling a toe angle and a camber angle of said left wheel;

a steering angle sensor for detecting a steering angle and a steering direction of the vehicle;

a car speed sensor for detecting car speed of said vehicle; and a controller including, basic control amount establishing means for establishing a toe angle correction value and a camber angle correction value for said right and left wheels, respectively, in accordance with said steering angle and said steering direction detected by said steering angle sensor, correction amount establishing means for establishing a toe angle correction amount and a camber angle correction amount for said right and left wheels, respectively, in accordance with the car speed detected by said car speed sensor, control gain setting means for setting a control gain that increases as said steering angle detected by said steering angle sensor increases, actual control amount establishing means for establishing an actual toe control amount of said first and second actuators, respectively, by adding said toe angle correction amount and said toe angle correction value, and multiplying by said control gain set by said control gain setting means, and an actual camber control amount of said first and second actuators, respectively, by adding said camber angle correction amount and said camber angle correction value, and multiplying by said control gain set by said control gain setting means, and control means for controlling said first and second actuators in accordance with said actual toe control amount and said actual camber control amount.

32. The automotive suspension alignment control unit of claim 31, wherein said control gain is set such that the actual control amount increases when the detected steering angle exceeds a specified value.

33. The alignment control unit of claim 32, wherein said control gain is set to a fixed value when the detected said steering angle is equal to or less than said specified value and gradually increases from said fixed value as the detected said steering angle exceeds said specified value.

34. An automotive suspension alignment control method for controlling toe angle and camber angle of a right wheel and a left wheel of a vehicle, comprising the steps of:
   detecting a steering angle and a steering direction;
   determining a toe angle correction value and a camber angle correction value for said right wheel and said left wheel in accordance with the detected steering angle and the steering direction;
   detecting car speed;
   setting a toe angle correction amount and a camber angle correction amount for said right wheel and said left wheel in accordance with the detected car speed;
   determining a control gain in accordance with the detected steering angle such that the control gain is set to a value which increases as the steering angle increases;
   determining an actual toe angle control amount by adding said toe angle control correction value and said toe angle correction amount, and multiplying by said control gain, and an actual camber angle control amount by adding said camber angle control correction value and said camber angle correction amount; and
   controlling said toe angle and said camber angle of said right and said left wheels in accordance with said actual toe control amount and said actual camber control amount.

35. The alignment control method of claim 34, wherein said control gain is set such that said actual control amount increases when the detected steering angle exceeds a specified value.

36. The alignment control method of claim 35, wherein said control gain is set to a fixed value when the detected said steering angle is equal to or less than said specified value and gradually increases from said fixed value as the detected said steering angle exceeds said specified value.

37. An automotive suspension alignment control unit for a vehicle for controlling toe angle and camber angle of a right wheel and a left wheel, respectively, comprising:
   first actuator for controlling a toe angle and a camber angle of said right wheel;
   second actuator for controlling a toe angle and a camber angle of said left wheel;
   a steering angle sensor for detecting a steering angle and a steering direction of the vehicle;
   a car speed sensor for detecting car speed of said vehicle; and
   a controller including,
      basic control amount establishing means for establishing a toe angle correction value and a camber angle correction value for said right and left wheels, respectively, in accordance with said steering angle and said steering direction detected by said steering angle sensor,
      correction amount establishing means for establishing a toe angle correction amount and a camber angle correction amount for said right and left wheels, respectively, in accordance with the car speed detected by said car speed sensor,
      a lateral acceleration sensor for detecting lateral acceleration acting on the vehicle in a lateral direction thereof;
      control gain setting means for setting a control gain in accordance with the detected lateral acceleration such that the control gain is set to a value which increases as the lateral acceleration increases;
      actual control amount establishing means for establishing an actual toe control amount of said first and second actuators, respectively, by adding said toe angle correction amount and said toe angle correction value, and multiplying by said control gain set by said control gain setting means, and an actual camber control amount of said first and second actuators, respectively, by adding said camber angle correction amount and said camber angle correction value, and multiplying by said control gain set by said control gain setting means, and
      control means for controlling said first and second actuators in accordance with said actual toe control amount and said actual camber control amount.

38. An automotive suspension alignment control method for controlling toe angle and camber angle of a right wheel and a left wheel of a vehicle, comprising the steps of:
   detecting a steering angle and a steering direction;
   determining a toe angle correction value and a camber angle correction value for said right wheel and said left wheel in accordance with the detected steering angle and the steering direction;
   detecting car speed;
   setting a toe angle correction amount and a camber angle correction amount for said right wheel and said left wheel in accordance with the detected car speed;
   detecting lateral acceleration acting on the vehicle in a lateral direction of the vehicle;
   determining a control gain in accordance with the detected lateral acceleration;
   determining an actual toe angle control amount by adding said toe angle control correction value and said toe angle correction amount, and multiplying by said control gain, and an actual camber angle control amount by adding said camber angle control correction value and said camber angle correction amount; and
   controlling said toe angle and said camber angle of said right and said left wheel in accordance with said actual toe control amount and said actual camber control amount.

39. The alignment control method of claim 38, wherein said control gain is set to a value which increases as the lateral acceleration increases.

* * * * *